March 27, 1928. 1,664,190

J. S. COLDWELL

RELEASABLE POWER CONNECTION AND EQUIVALENT DEVICE

Filed Nov. 14, 1923

INVENTOR
John S. Coldwell
BY
Franklin Hubbard
ATTORNEY

Patented Mar. 27, 1928.

1,664,190

UNITED STATES PATENT OFFICE.

JOHN S. COLDWELL, OF MILWAUKEE, WISCONSIN, ASSIGNOR TO THE CUTLER-HAMMER MFG. CO., OF MILWAUKEE, WISCONSIN, A CORPORATION OF WISCONSIN.

RELEASABLE POWER CONNECTION AND EQUIVALENT DEVICE.

Application filed November 14, 1923. Serial No. 674,635.

This invention relates to improvements in releasable power connections and equivalent devices, and more particularly to wear indicating and compensating means for the frictioning portions thereof.

While not limited thereto, the invention is applicable with particular advantage to electromagnetically operated clutches, brakes and the like.

Heretofore it has been customary to provide such devices with indicating means enabling ascertainment of the amount of clearance between opposed but non-engaging parts thereof and also the amount of wear upon the frictioning parts, adjusting means being also provided to enable compensation for such wear and the like.

The present invention has among its objects that of providing improvements in such indicating and compensating means.

Another object is that of providing in devices of the character aforementioned wear indicating and also compensating means wherein are obviated certain defects and disadvantages of the corresponding means heretofore employed.

Other objects and advantages will hereinafter appear.

Figure 1:
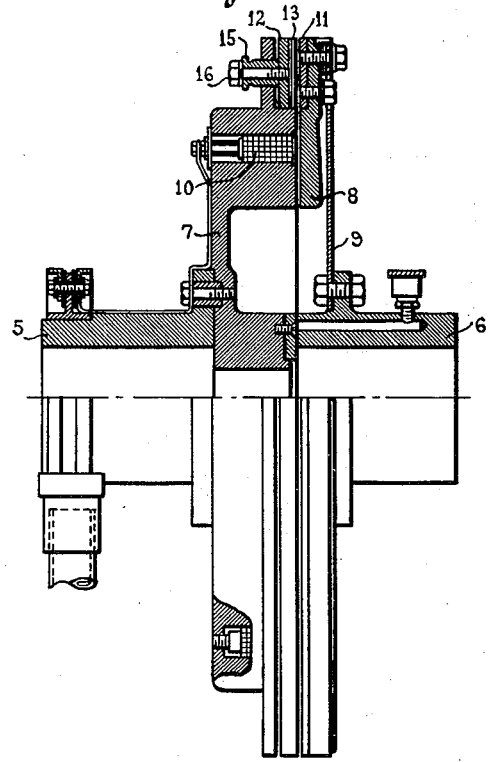
Figure 2:
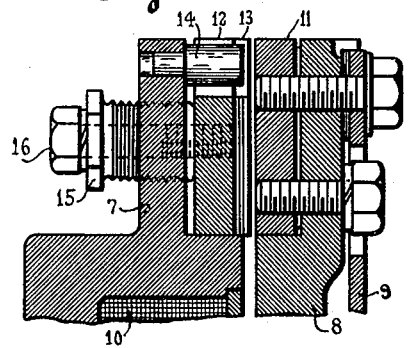

In the accompanying drawing, wherein are illustrated certain of the embodiments which the invention may assume in practice, Figure 1 is a side elevational view, partly in section, of a clutch embodying such improvements; while, Fig. 2 is a similar but partial view of the clutch in a slightly different position angularly, illustrating on an enlarged scale certain parts and features not shown in Fig. 1.

Referring first to Fig. 1 of the drawing, the same illustrates an electromagnetically engageable clutch, generically of conventional form, comprising hub portions 5 and 6 to be secured respectively to the adjacent ends of the shafts to be coupled, a field element 7 rigidly secured to hub 5 and an armature element 8 permanently secured to hub 6 by means of a spring plate 9 adapted to yield axially, said armature and field member having adjacent parallel polar faces which are concealed while the clutch remains in assembled relation. A magnetizing coil 10 carried by member 7 serves when energized to cause mutual attraction between said polar faces. A ring 11, preferably of steel or other wear resisting material, is rigidly secured to armature element 8 adjacent its periphery.

A corresponding ring 12 having secured thereto a friction lining or face 13 is carried by field element 7 in a relation providing for axial adjustability with reference thereto, provision also being made against relative angular movemeint of said field member and said ring.

In practice said ring 12 is preferably maintained in such axial relation to its associated parts that the friction lining 13 projects a definite and constant distance, as for example, one thirty-second of an inch beyond its associated polar face, whereby frictional engagement of said lining 13 with the ring 11 of armature 8 serves to transmit the torque between the coupled shafts.

For purposes of efficient and satisfactory operation of the device it is of great importance that a definite axial relation of the exposed surface of said friction ring 13 be maintained, since if such ring projects too far beyond its associated polar face the air gap between the associated polar faces is unduly increased with resultant curtailment of the clutch engaging forces and possible slippage. Again, if as a result of wear or other cause, said friction ring 13 projects insufficiently the adjacent polar faces are likely to come into engagement with one another with resultant mutual scoring and abrasion or else the same may seal magnetically whereby release of the clutch may be seriously delayed and deranged.

From the foregoing, it is essential that adequate means be provided both for definitely ascertaining the position of the exposed surface of said friction ring with reference to its associated concealed polar face, and for readily and accurately adjusting such position whenever as a result of wear or other cause the aforementioned relation as so ascertained is found to be improper.

To such end it is herein proposed to provide the field member with one or more permanently mounted indicating devices or sounding plugs 14 so designed and arranged as to indicate continuously and accurately the amount of projection of said lining 13 beyond its associated polar face, and to so indicate without reference to the position of the opposing polar face of armature 8. This latter feature is of great importance in that it enables accurate indications irrespective of whether the clutch be engaged or disengaged, whereas in the use of sounding pins or analogous indicators which require engagement of the clutch, great difficulty has been encountered particularly in installations wherein the clutch energizing current is derived from the exciter of the driving motor whereby the clutch cannot be normally engaged except with concurrent rotation thereof such as to prevent the taking of observations.

In practice sounding plug 14 may be preferably constructed and arranged substantially as shown in Fig. 2. Said plug is preferably directly and permanently mounted, as by riveting, adjacent the periphery of field member 7, said member having a suitable bore extending parallel to the axis to receive a reduced portion of the plug and the plug having preferably a shoulder to abut the face of said element for accurate positioning with reference thereto. The length of said plug is such that the projecting portion thereof terminates within the plane of the polar face of said field element 7. Ring 12 and lining 13 are provided with aligned peripherally open slots, as shown, to afford clearance and exterior visibility of plug 14, whereby by observation of the projection of the exposed surface of said lining 13 beyond the end of said plug the physical relation between such exposed surface and said polar face may be determined.

In practice it is preferred to provide a plurality of sounding plugs, as aforedescribed, at regions substantially equally spaced peripherally of the field element 7.

By means of the foregoing construction and arrangement the location of the friction surface of lining 13 with reference to its associated concealed polar face may be readily and accurately determined without requiring engagement of the clutch.

When, as indicated by the aforedescribed means or otherwise, axial adjustment of friction ring 12 and lining 13 is required such adjustment may be effected by the means now to be described.

As illustrated in full lines in Fig. 1, and in dotted lines in Fig. 2, the field element 7 is provided with tapped holes each to receive a correspondingly threaded adjusting plug or thimble 15 having a flat inner end to abut the ring 12 and a polygonal head to facilitate turning thereof. Each of said plugs 15 is further provided with a central bore to receive a cap screw 16, the latter being adapted to extend through the plug and therebeyond to take within a correspondingly tapped opening in the ring 12. A suitable lock washer is preferably interposed between the adjacent shouldered portions of the plug and cap screw to assist in mutual clamping and firm interlocking thereof.

Axial adjustment of ring 12, having friction lining 13 rigidly secured thereto may be effected by loosening each of said cap screws and thereafter giving all of the plugs 15 a like number of turns or parts of a turn in the common direction necessary for effecting the desired or necessary adjustment of the friction device. Thereafter the cap screws are tightened, the plugs 15 being held if necessary to prevent unwarranted misadjustment thereof during such latter operation.

By the foregoing construction and arrangement, ready and accurate continuous axial adjustability of said friction device is provided with strong, rigid and permanent securement thereof against angular movement or unwarranted axial movement relative to its associated field member.

What I claim as new and desire to secure by Letters Patent is:

1. In a clutch or the like having a magnetic element, the combination with a friction device having a surface to be definitely located with reference to a normally concealed portion of said element, and means rigidly secured to said magnetic element to indicate the relation of said surface to said concealed portion of said element.

2. In a clutch or the like having a magnetic element, the combination with a friction device having a surface to be definitely located with reference to a normally concealed portion of said element, of means for securing said device to said element, means rigidly secured to said element to indicate the relation of said surface to said portion of said element and means associated with said securing means for effecting continuous permanent adjustment of such relation.

3. In an electromagnetic clutch or the like having co-operating elements adapted to relative rotatory and translatory movement and provided with normally concealed parallel opposing surfaces, the combination with a friction device carried between said elements and functioning to maintain separation of said surfaces, of plural adjustable securing mechanisms for said friction device, each of said mechanisms comprising a bored plug to be screwed through an opening in one of said elements in a relation to abut said friction device and a screw to penetrate the bore of said plug and to take within a tapped opening of said friction device, said screw and said plug having opposed co-operating clamping shoulders.

4. In an electromagnetic clutch or the like having co-operating elements adapted to relative rotatory and translatory movement and provided with normally concealed parallel opposing surfaces, the combination with a friction device carried between said elements and functioning to maintain separation of said surfaces, of plural adjustable securing mechanisms for said friction device, and means for indicating the relation of said friction device to said concealed surface of its associated element, comprising a sounding plug fixed to a peripheral portion of said element in a relation to extend within a peripherally open slot of said friction device and to terminate in the plane of said concealed surface.

5. In a magnetic clutch or the like having opposed relatively movable magnetic members, in combination, a friction part carried by one of said members to engage the other and to maintain an air gap therebetween, said friction part having means to afford positive and continuous adjustments thereof toward and away from the magnet member by which it is carried and an element carried by the last mentioned magnet member to indicate, with the clutch released, the air gap afforded by adjustments of said friction part.

6. In an electromagnetic clutch or the like having cooperating elements adapted to relative rotatory and translatory movement, the combination with a friction device carried by one of said elements and functioning to maintain separation of said elements, of an adjustable securing device for said friction device comprising a plug to be screwed through an opening in said first-mentioned element in a relation to abut said friction device and a screw member located within an opening in said plug and associated with said friction device to clamp the latter against said plug.

7. In an electromagnetic clutch or the like having cooperating elements adapted to relative rotatory and translatory movement, the combination with an annular friction ring mounted upon one of said elements and functioning to maintain separation of said elements, of plural adjustable securing mechanisms for said friction device, each of said mechanisms comprising a bored plug to be screwed through an opening in one of said elements in a relation to abut said friction device and a screw to penetrate the bore of said plug and to take within a tapped opening of said friction device, said screw and said plug having opposed cooperating clamping shoulders.

In witness whereof, I have hereunto subscribed my name.

JOHN S. COLDWELL.